A. SCOTT.
VEHICLE WHEEL.
APPLICATION FILED NOV. 20, 1911.
1,060,505.
Patented Apr. 29, 1913.
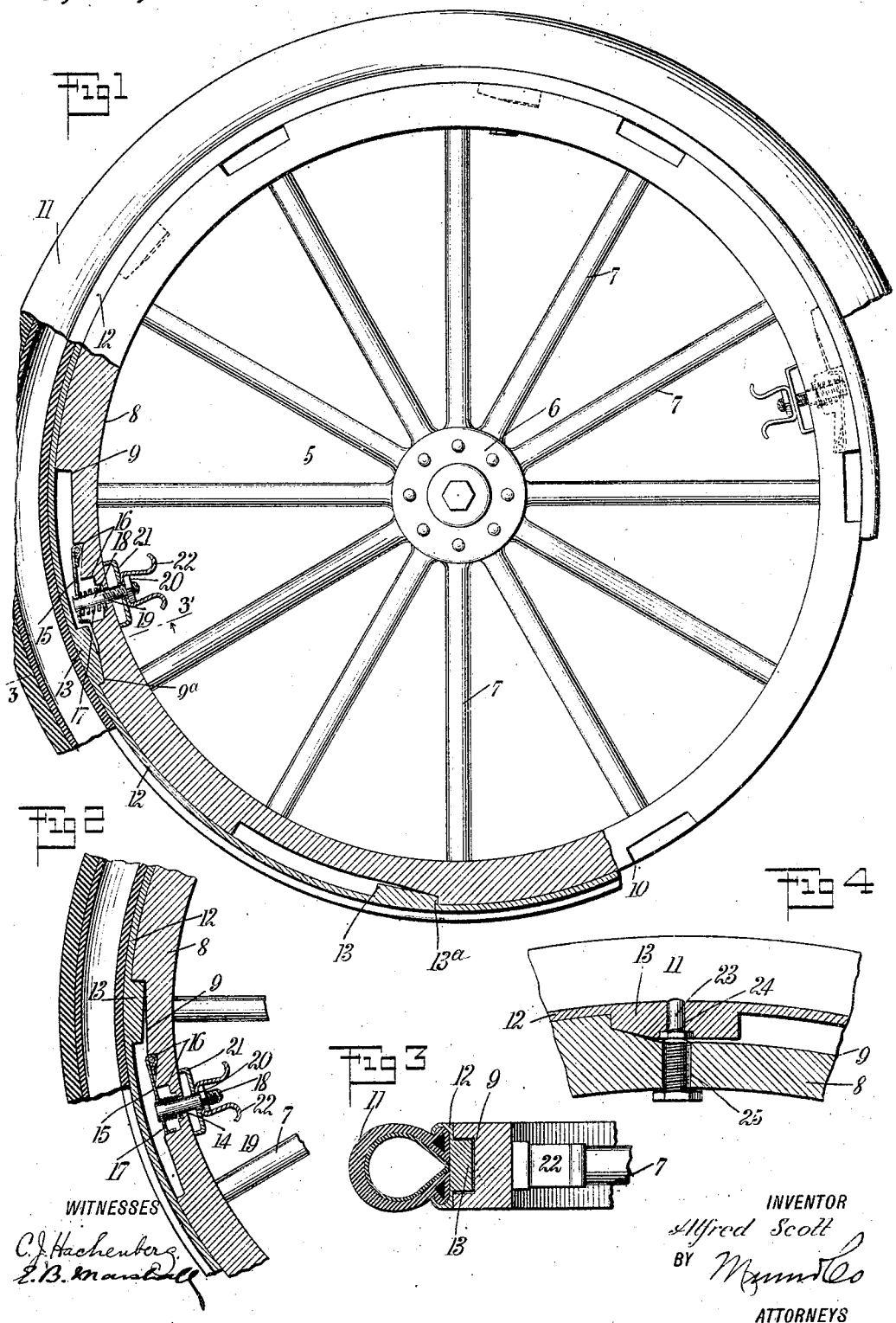
INVENTOR
Alfred Scott
BY Munn & Co
ATTORNEYS

UNITED STATES PATENT OFFICE.

ALFRED SCOTT, OF PRINCETON, NEW JERSEY, ASSIGNOR OF ONE-HALF TO GEORGE BEDDIGES, OF PRINCETON, NEW JERSEY.

VEHICLE-WHEEL.

1,060,505.     Specification of Letters Patent.    Patented Apr. 29, 1913.

Application filed November 20, 1911. Serial No. 661,251.

*To all whom it may concern:*

Be it known that I, ALFRED SCOTT, a citizen of the United States, and a resident of Princeton, in the county of Mercer and State of New Jersey, have invented certain new and useful Improvements in Vehicle-Wheels, of which the following is a full, clear, and exact description.

My invention relates to improvements in vehicle wheels, and it has for its object to provide one with a fixed rim having recesses in its periphery in which plugs on a rim are normally disposed, the plugs being held normally against rotation relatively to the fixed rim by catch members which, at the will of the operator, may be moved out of the path of the plugs, so that the rim may rotate relatively to the fixed rim to a position where the plugs are disposed at the lateral openings in the fixed rim to permit of the removal of the rim from the fixed rim by moving the rim laterally relatively to the fixed rim.

Additional objects of the invention will appear in the following complete specification, in which the preferred form of the invention is disclosed.

In the drawings similar characters of reference indicate corresponding parts in all the views, in which—

Figure 1 is an elevational view, partially in section, of a wheel provided with my improvement, parts being broken away; Fig. 2 is a fragmentary sectional view, showing the outer rim having the plugs in position relatively to the inner rim or fixed rim to permit the plugs to pass through the lateral openings in the fixed rim; Fig. 3 is a sectional view on the line 3—3 of Fig. 1; and Fig. 4 is a fragmentary sectional view showing how the valve for the pneumatic tire mounted on the outer rim is disposed through one of the plugs.

By referring to the drawings it will be seen that the wheel 5 has a hub 6 and spokes 7, which connect the hub 6 with the fixed rim 8. This fixed rim 8 has a plurality of recesses 9 in its periphery, there being lateral openings 10 in the fixed rim 8, which extend to the recesses. A pneumatic tire 11 is secured to the outer rim 12 in any preferred manner, this outer rim 12 having plugs 13, which are adapted to enter the recesses 9 through the lateral openings 10 in the fixed rim. When the plugs 13 are disposed on the recesses 9 it is impossible to move them with the outer rim 12 relatively to the fixed rim 8, and away from the lateral openings 10. In order to hold the outer rim 12 relatively to the fixed rim 8 when the plugs 13 have been moved in the recesses 9 away from the lateral openings 10, I provide a catch device 14, which consists of a catch member 15 pivoted in a recess 9, this catch member 15 being provided for engaging an end of the plug 13 for holding the said plug against one end of the recess 9. There are openings 16 in the fixed rim 8 for receiving the clamping member 15 when it is moved out of the path of the plugs 13 to permit of the movement of the outer rim 12 relatively to the fixed rim 8, so that the plugs 13 may be disposed at the lateral recesses 10 to permit of the removal of the outer rim. A spring 17 presses yieldingly against the clamp member 15, for holding it in the recess 9, and this spring 17 is disposed around a stud 18, which is secured to the catch member 13, so that when the stud 18 is drawn inwardly it will carry with it the catch member 15, out of the path of the plugs 13. This stud 18 is disposed through an orifice 19 in the fixed rim 8, which communicates with one of the openings 16. The stud 18 is threaded and meshing with the threads on the stud there is a nut 20. There is a wing member 22 having an orifice through which the stud 19 is disposed, this wing member 22 engaging the sides of the nut 20, so that when the wing member 22 is rotated it will carry with it the said nut 20. The wing member 22 presses against a seat 21, which also has an orifice through which the stud 19 is disposed, this seat 21 resting against the inner side of the inner rim or fixed rim 8.

In the drawings I show two of the clamping devices 14, but it will be understood that I may make use of only one of the clamping devices, or should occasion require a number of them may be employed.

In Fig. 4 of the drawings I show a valve 23, for the pneumatic tire 11, this valve 23 projecting in an opening 24, in one of the plugs 13. There is a threaded opening 25 in the fixed rim 8, which registers with the valve 23, when the plugs 13 travel in the recesses, so that one of them has passed a clamping device 14, and the outer rim is held thereby relatively to the fixed rim. It will be seen that the plugs are tapered toward their ends 13ª, and that the recesses 9 are similarly tapered at 9ª, so that the plugs will be wedged at the ends of the recesses to assist in holding the outer rim relatively to the fixed rim. When the wheel is driven ahead the ends 13ª of the plugs are driven against the ends 9ª of the recesses 9, and there is no strain on the catch members, but when the vehicle is backed the catch members serve to prevent the plugs 13 from traveling in the recesses 9, and the outer rim 12 is thereby prevented from moving relatively to the fixed rim 8.

Having thus described my invention I claim as new and desire to secure by Letters Patent:

1. In a wheel a rim having a recess with an opening extending through the side of the rim and a radially disposed orifice leading to the recess, a second rim having a plug adapted to enter the recess through the opening and to move in the recess when the second rim is rotated relatively to the first rim, a catch member pivoted at one end in the recess to engage the plug to limit the movement of the plug in the recess, a threaded stud disposed in the orifice and secured to the other end of the catch member to move the catch member out of the path of the plug, a nut meshing with the thread on the stud, and a seat against which the nut is adapted to press.

2. In a wheel a rim having a recess with an opening extending through the side of the rim and a radially disposed orifice leading to the recess, a second rim having a plug adapted to enter the recess through the opening and to move in the recess when the second rim is rotated relatively to the first rim, a catch member pivoted at one end in the recess for engaging the plug to limit the movement of the plug in the recess, a threaded stud disposed in the orifice and secured to the other end of the catch member to move the catch member out of the path of the plug, a spring on the stud for engaging the first rim and the catch member for holding the catch member in the path of the plug, a nut meshing with the thread on the stud, and a seat against which the nut is adapted to press.

3. In a wheel a rim having a recess with a lateral opening through the side of the rim extending to the recess, and a radial opening in the rim extending to the recess and spaced along the rim from the lateral opening, a second rim having a pneumatic tire, a plug, and a valve for the pneumatic tire, extending through the plug, the plug being adapted to enter the recess through the lateral opening, and to move a distance in the recess until the valve is disposed at the radial opening and means disposed through the radial opening for engaging the plug.

In testimony whereof I have signed my name to this specification in the presence of two subscribing witnesses.

ALFRED SCOTT.

Witnesses:
   FREDRICK J. SCHAEFER,
   GEORGE BEDDIGES.